United States Patent [19]

Furukoshi

[11] Patent Number: 5,475,288
[45] Date of Patent: Dec. 12, 1995

[54] DRIVE CIRCUIT FOR AN ULTRASONIC MOTOR HAVING NOISE CANCELLATION METALS AND METHOD FOR USING SAME

[75] Inventor: Hiroyuki Furukoshi, Aichi, Japan

[73] Assignee: Asmo Co., Ltd., Shizuoka, Japan

[21] Appl. No.: 162,298

[22] Filed: Dec. 7, 1993

[30] Foreign Application Priority Data

Dec. 10, 1992 [JP] Japan .................................. 4-330215

[51] Int. Cl.⁶ .............................. H02P 5/00; H01L 41/08
[52] U.S. Cl. ............................................. 318/116; 310/316
[58] Field of Search ...................... 318/116, 118; 310/316, 317, 323, 328, 51; 361/23, 111, 91

[56] References Cited

U.S. PATENT DOCUMENTS

| | | | |
|---|---|---|---|
| 4,998,048 | 3/1991 | Furutsu | 318/116 |
| 5,061,882 | 10/1991 | Takagi | 318/116 |
| 5,153,486 | 10/1992 | Hirotomi | 318/116 |
| 5,159,223 | 10/1992 | Suganuma | 310/316 |
| 5,165,047 | 11/1992 | Shimizu | 318/116 |
| 5,173,631 | 12/1992 | Suguanuma | 310/316 |
| 5,233,274 | 8/1993 | Honda et al. | 318/116 |
| 5,376,855 | 12/1994 | Sugunuma | 310/316 |

FOREIGN PATENT DOCUMENTS

| | | |
|---|---|---|
| 62-203575 | 9/1987 | Japan . |
| 1-255482 | 10/1989 | Japan . |
| 3-159583 | 7/1991 | Japan . |
| 4-61593 | 10/1992 | Japan . |

Primary Examiner—Jonathan Wysocki
Attorney, Agent, or Firm—Fisher & Associates

[57] ABSTRACT

A drive circuit for driving an ultrasonic motor which maintains frequencies of drive signals for the ultrasonic motor within a drive frequency band. Generation of audible sound is thereby prevented. Further, it is possible to drive an ultrasonic motor in which irregularity of a waveform of a detection signal does not occur in an audible sound generating band.

15 Claims, 9 Drawing Sheets

LEVEL OF OUTPUT
SIGNAL FROM
PIEZOELECTRIC
ELEMENT

LEVEL OF REFERENCE
VOLTAGE

LEVEL OF INPUT
SIGNAL OF
COMPARATOR

LEVEL OF OUTPUT
SIGNAL OF
COMPARATOR

VOLTAGE BETWEEN
BOTH ENDS OF
CAPACITOR 62

FIG. 7A
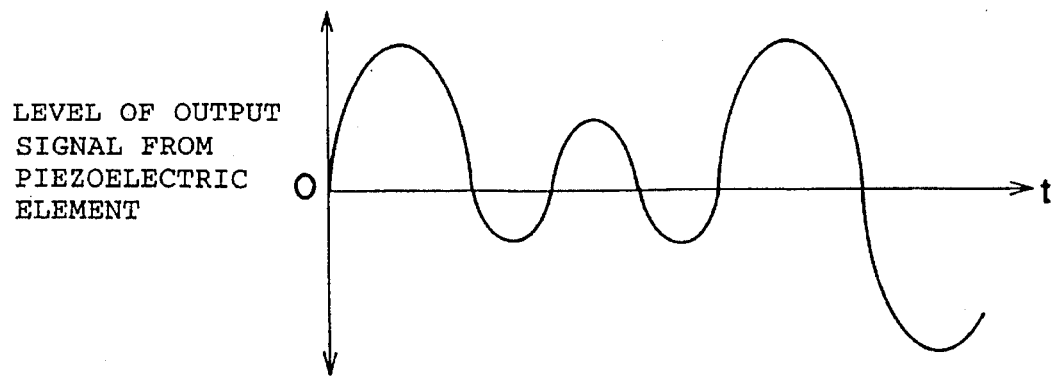
FIG. 7B
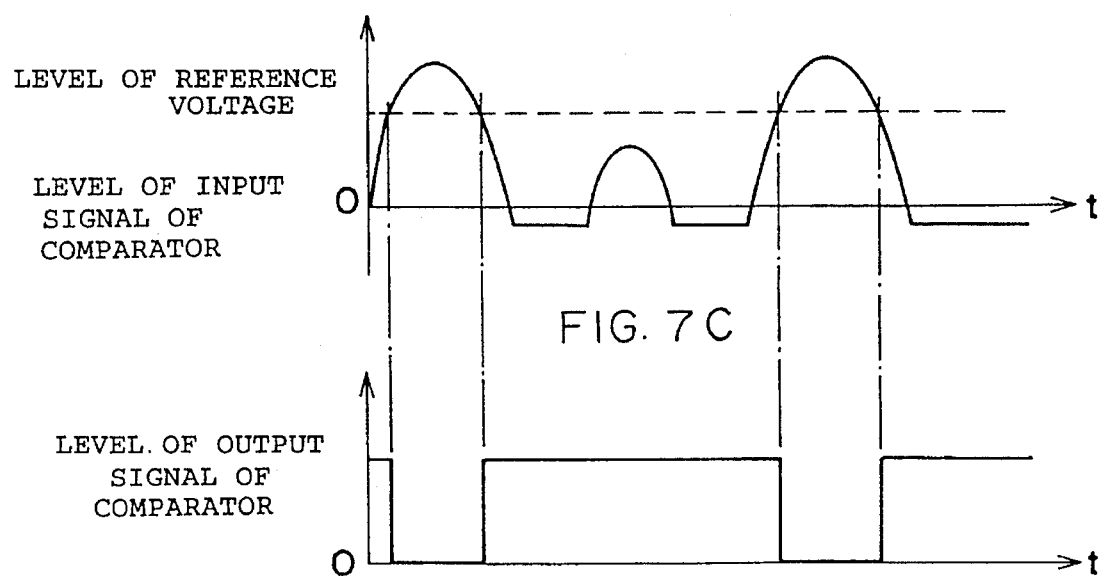
FIG. 7C
FIG. 7D
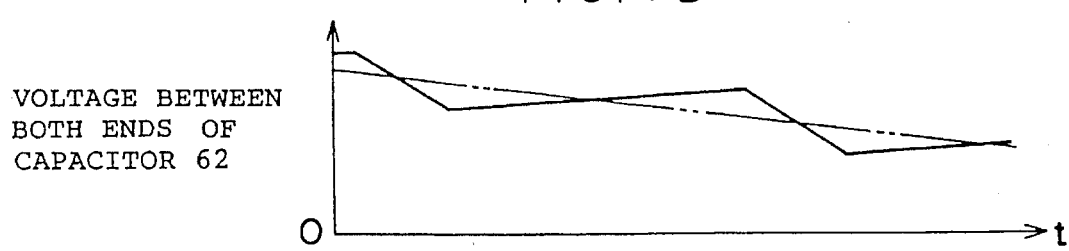

LEVEL OF OUTPUT
SIGNAL FROM
PIEZOELECTRIC
ELEMENT

LEVEL OF REFERENCE
VOLTAGE
LEVEL OF INPUT
SIGNAL OF
COMPARATOR

LEVEL OF OUTPUT
SIGNAL OF
COMPARATOR

VOLTAGE BETWEEN
BOTH ENDS OF
CAPACITOR 62

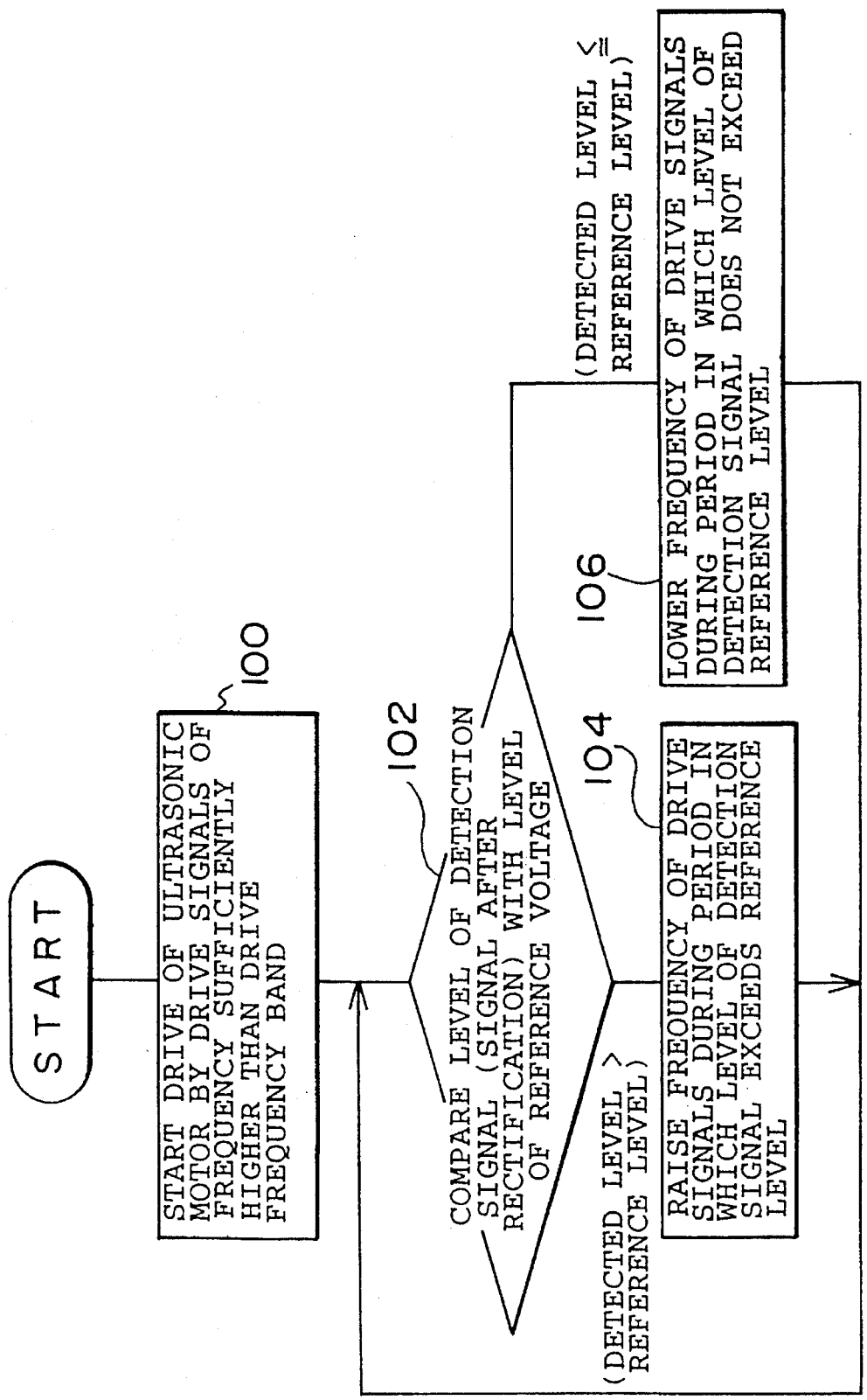

DRIVE CIRCUIT FOR AN ULTRASONIC MOTOR HAVING NOISE CANCELLATION METALS AND METHOD FOR USING SAME

BACKGROUND OF THE INVENTION

1. Field of the Invention

The present invention relates to a drive circuit for driving an ultrasonic motor and a method of driving and controlling the ultrasonic motor.

2. Related Art

Conventionally, ultrasonic motors have been known in which ultrasonic vibration is utilized to generate a driving force. In a traveling-wave type ultrasonic motor, a piezoelectric body is adhered to an annular elastic body to form a stator, against which a rotor attached to a drive shaft is pressed so as to contact the stator. A drive circuit for the ultrasonic motor supplies the piezoelectric body with a sine-wave drive signal and a cosine-wave drive signal of predetermined frequencies. Due to mechanical vibration generated by these two drive signals, an ultrasonic vibration (traveling wave) whose loops and nodes travel in a circumferential direction along the elastic body is excited in the elastic body. Due to the traveling wave, the rotor which contacts the elastic body and the drive shaft are rotated.

The amplitude of the mechanical vibration generated in the piezoelectric body becomes a maximum when the frequencies of the drive signals coincide with the resonant frequency. However, within a specific frequency band including the resonant frequency, abnormal vibrations of an audible frequency are generated in the elastic body, and the vibrations lower the rotational speed of the rotor and the efficiency of the ultrasonic motor. Accordingly, the ultrasonic motor is driven such that drive signals whose frequencies are sufficiently higher than a frequency band in which audible sound is generated (hereinafter referred to as "audible sound generating band") are initially supplied to the ultrasonic motor. The frequencies of the drive signals are then gradually lowered so as to enter a drive frequency band slightly higher than the audible sound generating band and are then maintained within this drive frequency band.

The audible sound generating band and the drive frequency band of the ultrasonic motor change depending on the ambient temperature of the ultrasonic motor and the magnitude of the load acting on the ultrasonic motor. Accordingly, the proper frequencies of the drive signals must not be constant and must be changed in accordance with the ambient temperature, the load and the like. Therefore, a device has been proposed in which a piezoelectric element is adhered to the elastic body so as to control the frequencies of the drive signals based on an AC detection signal which is output from the piezoelectric element in accordance with the ultrasonic vibration of the elastic body.

As an example of frequency control of drive signals, a technique is disclosed in Japanese Patent Application Laid-open No. 62-203575 in which a detection signal output from a piezoelectric element is subjected to half-wave rectification by a diode, followed by smoothing with a capacitor to obtain a smoothed signal. The frequency is controlled such that the level of the smoothed signal becomes a predetermined value lower than a predetermined level which is obtained at the above-mentioned resonant frequency. Another technique is disclosed in Japanese Patent Application Laid-open No. 3-159583 in which irregularity of the waveform of a detection signal output from a piezoelectric element is monitored, and the frequencies of drive signals are lowered when irregularity of the waveform does not occur. On the contrary, when irregularity of the waveform occurs, it is judged that the frequencies of the drive signals have entered the audible sound generating band, and the frequencies are raised.

In the frequency control arrangement disclosed in Japanese Patent Application Laid-open No. 62-203575, the level of a signal obtained by smoothing the detection signal output from the piezoelectric element, namely, the average level of the detection signal, is compared with a predetermined level. Therefore, even when the frequencies of the drive signals enter the audible sound generating band and irregularity of the waveform occurs, the frequencies are lowered if the average level of the detection signal is lower than the above-mentioned predetermined level. Accordingly, this frequency control arrangement has the drawback that the frequencies of the drive signals enter the audible sound generating band so that audible sound is generated from the ultrasonic motor.

Further, among various ultrasonic motors, there are some ultrasonic motors in which irregularity of the waveform of the detection signal does not occur even when the frequencies of the drive signals enter the audible sound generating band because of their shapes and sizes, pressing force of the rotor and the stator, and other factors. When the frequency control method disclosed in Japanese Patent Application Laid-open No. 3-159583 is used for driving the above-mentioned ultrasonic motor, the frequencies of the drive signals are lowered and enter the audible sound generating band, and are further lowered, passing the resonant frequency, because irregularity of the waveform of the detection signal does not occur even when the frequencies of the drive signals enters the audible sound generating band. Accordingly, this frequency control method is not suitable for ultrasonic motors in which irregularity of the waveform of the detection signal does not occur in the audible sound generating band.

SUMMARY OF THE INVENTION

The present invention has been accomplished by taking the above-mentioned facts into consideration, and the object of the present invention is to provide a drive circuit for an ultrasonic motor and a method of driving and controlling the ultrasonic motor which results in an ultrasonic motor in which audible sounds are not generated.

Further, another object of the present invention is to provide a drive circuit for an ultrasonic motor and a method of driving and controlling the ultrasonic motor which is capable of driving even ultrasonic motors in which irregularity of the waveform of a detection signal does not occur in the audible sound generating band.

To achieve the above-mentioned objects, a drive circuit for an ultrasonic motor according to the present invention comprises drive signal output means for outputting ultrasonic motor drive signals of predetermined frequencies, detection means for detecting vibration of a stator of the ultrasonic motor and for outputting a detection signal whose amplitude corresponds to the vibration, judging means for judging whether the level of the detection signal is less than or equal to a predetermined level which is set in advance, and frequency control means for bringing the frequencies of the drive signals into a drive frequency band by raising the frequencies of the drive signals only in a period in which the level of the detection signal exceeds the predetermined level in a case in which the level of the detection signal exceeds the predetermined level, and by lowering the frequencies of the drive signals only in a period in which the level of the detection signal is less than or equal to the predetermined level in a case in which the level of the detection signal is less than or equal to the predetermined level.

The present invention also provides a method of driving and controlling an ultrasonic motor comprising the steps of outputting ultrasonic motor drive signals of predetermined frequencies, detecting vibration of a stator of the ultrasonic motor and outputting a detection signal whose amplitude corresponds to the vibration, judging whether a level of the detection signal is less than or equal to a predetermined level which is set in advance, and bringing the frequencies of the drive signals into a drive frequency band by raising the frequencies of the drive signals only in a period in which the level of the detection signal exceeds the predetermined level in a case in which the level of the detection signal exceeds the predetermined level, and by lowering the frequencies of the drive signals only in a period in which the level of the detection signal is less than or equal to the predetermined level in a case in which the level of the detection signal is less than or equal to the predetermined level.

In the present invention, it is judged whether the level of a detection signal, which is output from the detection means and whose amplitude corresponds to vibration of the stator of the ultrasonic motor, is less than or equal to the predetermined level which has been set in advance. When the level of the detection signal exceeds the predetermined level, the frequencies of the drive signals are raised by the frequency control means only in a period in which the level of the detection signal exceeds the predetermined level. When the level of the detection signal is less than or equal to the predetermined level, the frequencies of the drive signals are lowered only in a period in which the level of the detection signal is less than or equal to the predetermined level. The above-mentioned predetermined level is set at a value such that an amount of change in the frequency control medium (for example, voltage) for raising the frequencies in a period in which the level of the detection signal exceeds the predetermined level and an amount of change in the frequency control medium (for example, voltage) for lowering the frequencies in a period in which the level of the detection signal is less than or equal to the predetermined level become equal when the ultrasonic motor is driven by the drive signals whose frequencies are within the drive frequency band.

In a case in which the frequencies of the drive signals are sufficiently higher than the drive frequency band, the amplitude of vibration generated in the stator is small, and the amplitude of the detection signal is also small. Therefore, the length of each period in which the level of the detection signal exceeds the predetermined level is extremely short, or such a period does not exist. Accordingly, since the length of each period in which the level of the detection signal is less than or equal to the predetermined level is long, the frequencies of the drive signals are changed so as to become lower on the whole, i.e., so as to approach the drive frequency band.

When the frequencies of the drive signals are lowered, the amplitude of vibration generated in the stator and the amplitude of the detection signal become larger so that the length of each period in which the level of the detection signal exceeds the predetermined level gradually becomes longer. When the frequencies of the drive signals reach the drive frequency band, as described above, an amount of change in the frequency control medium for raising the frequencies in a period in which the level of the detection signal exceeds the predetermined level and an amount of change in the frequency control medium for lowering the frequencies in a period in which the level of the detection signal is less than or equal to the predetermined level become equal. Accordingly, the frequencies of the drive signals are controlled so as to roughly maintain their present values. Therefore, the driving of the ultrasonic motor at frequencies within the drive frequency band is continued.

Further, when the frequencies of the drive signals enter the audible sound generating band due to changes in ambient temperature, changes in load and the like, irregularity of the waveform occurs. Due to this irregularity, periods in which the amplitude of the detected signal far exceeds the predetermined level and periods in which the amplitude does not reach the predetermined level are produced. As a whole, compared to the case in which the ultrasonic motor is driven in the drive frequency band, the length of each period in which the signal exceeds the predetermined level due to the large amplitude becomes long. In this case, the frequencies of the drive signals are changed so as to increase as a whole. Accordingly, the frequencies are controlled to return to the drive frequency band when the frequencies of the drive signals enter the audible sound generating band.

In the present invention, the frequencies of the drive signals are controlled to stay in the drive frequency band, as described above. Therefore, the ultrasonic motor can always be driven at an optimum frequency without causing any drawbacks such as the frequencies entering the audible sound generating band such that audible sound is generated from the ultrasonic motor.

In a case of driving a ultrasonic motor in which irregularity of the waveform of a drive signal does not occur even when the frequencies of the drive signals enter the audible sound generating band, the amplitude of the detection signal increases when the frequencies of the drive signals enter the audible sound generating band even though irregularity of the waveform of the detection signal does not occur. As a result, the length of each period in which the level of the detected signal exceeds the predetermined level becomes longer, and the frequencies of the drive signals are changed to increase as a whole. Accordingly, the frequencies are changed so as to return to the drive frequency band when the frequencies of the drive signals enter the audible sound generating band even in a case of driving an ultrasonic motor in which irregularity of the waveform of a drive signal does not occur in the audible sound generating band. Accordingly, it becomes possible to drive ultrasonic motors in which irregularity of the waveform does not occur in the audible sound generating band.

As described above, in the drive circuit according to the present invention, it is judged whether the level of a detection signal whose amplitude corresponds to vibration of the stator of the ultrasonic motor, is less than or equal to the predetermined level. The frequencies of the drive signals are raised only in a period in which the level of the detection signal exceeds the predetermined level, and are lowered only in a period in which the level of the detection signal is less than or equal to the predetermined level. Therefore, the present invention has an excellent effect in that it is possible to drive an ultrasonic motor without the generation of audible sound even when irregularity of the waveform does not occur in the ultrasonic motor.

BRIEF DESCRIPTION OF THE DRAWINGS

FIG. 7A is a diagram showing an output signal from the piezoelectric element in a case in which the frequencies of the drive signals are in the audible sound generating band and irregularity of the amplitude and period of vibration of an elastic body occurs.

FIG. 7B is a diagram showing an input signal input to the comparator in a case in which the frequencies of the drive signals are in the audible sound generating band and irregularity of the amplitude and period of vibration of the elastic body occurs.

FIG. 7C is a diagram showing an output signal from the comparator in a case in which the frequencies of the drive signals are in the audible sound generating band and irregularity of the amplitude and period of vibration of the elastic body occurs.

FIG. 7D is a diagram showing a change in the level of the voltage V between both terminals of the capacitor in a case in which the frequencies of the drive signals are in the audible sound generating band and irregularity of the amplitude and period of vibration of the elastic body occurs.

FIG. 9 is a flowchart briefly showing operation for driving the ultrasonic motor by a drive circuit according to the present embodiment.

DETAILED DESCRIPTION OF THE PREFERRED EMBODIMENT

Figure 2:
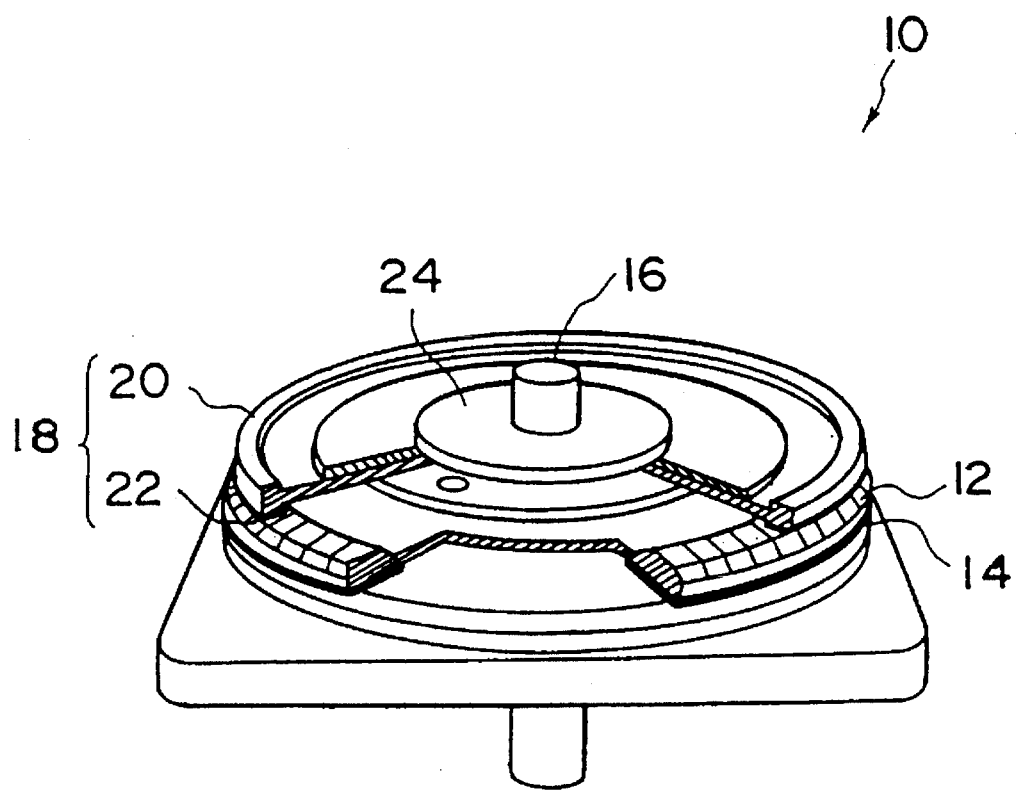
FIG. 2 is a perspective view showing the structure of the ultrasonic motor.

The present invention will now be explained in detail with reference to the drawings. FIG. 2 shows a traveling-wave type ultrasonic motor 10 according to the present embodiment. The ultrasonic motor 10 has an annular elastic body 12 made of a copper alloy or the like, and a piezoelectric body 14 is adhered to the elastic body 12, thereby forming a stator.

The piezoelectric body 14 is made of a piezoelectric material which converts electric signals to mechanical vibrations. The piezoelectric body 14 is divided into a plurality of portions arranged in the circumferential direction with a plurality of electrodes being provided thereon. A rotor 18 attached to the drive shaft 16 is comprised of a rotor ring 20 made of an aluminum alloy or the like, and an annular slider 22 which is bonded to the rotor ring 20. The slider 22 is urged by a spring 24 against the above-mentioned elastic body 12 so as to contact the elastic body 12. To obtain a stable frictional force and frictional coefficient, the slider 22 is made of an engineering plastic or the like. Accordingly, the rotor 18 can be driven efficiently.

Figure 1:
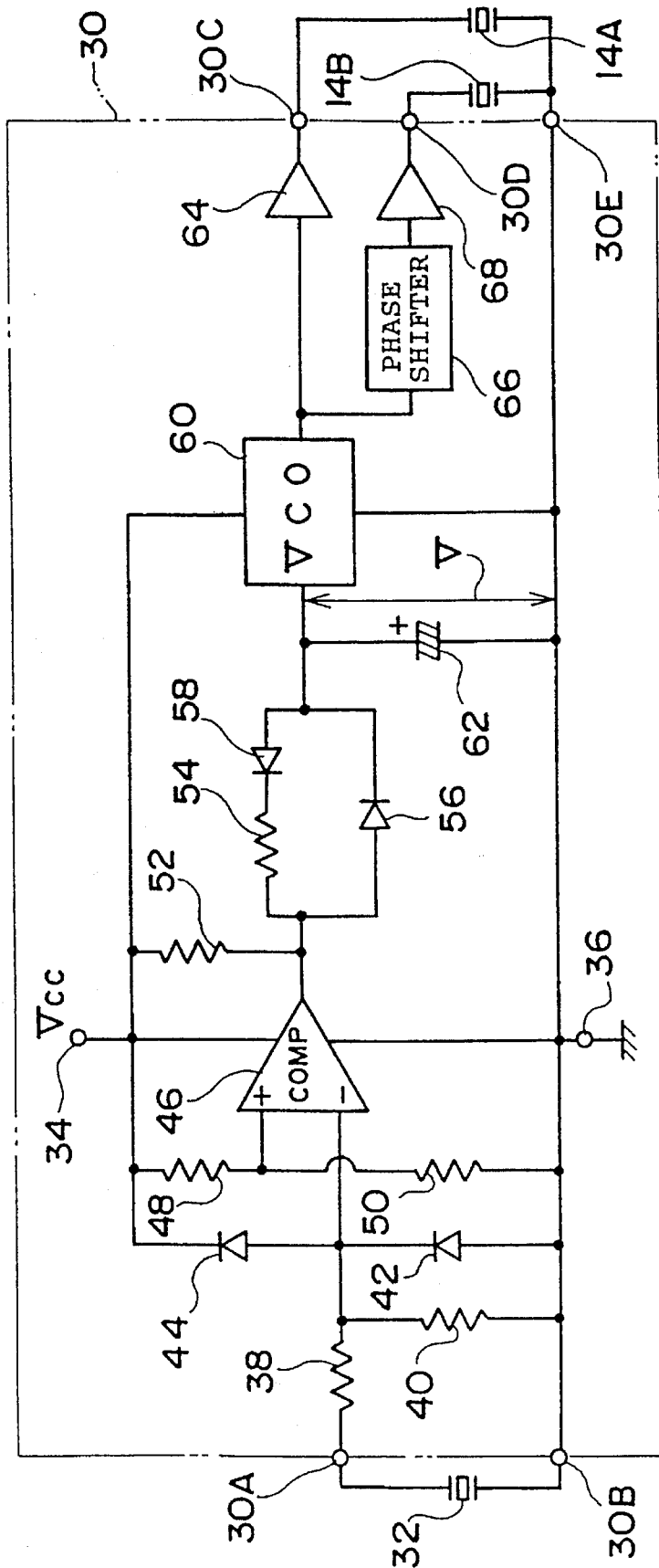
FIG. 1 is a circuit diagram showing the structure of a drive circuit for an ultrasonic motor according to the present embodiment.

Further, a piezoelectric element 32 (see FIG. 1) is adhered to the elastic body 12. As shown in FIG. 1, the piezoelectric element 32 is connected to terminals 30A and 30B of an ultrasonic motor drive circuit 30. The piezoelectric element 32 detects vibration of the elastic body 12, and outputs to the drive circuit 30 an AC signal whose amplitude and period change according to the vibration.

One end of a resistor 38 is connected to the terminal 30A while the terminal 30B is connected to a ground terminal 36. Connected to the other end of the resistor 38 are one end of a resistor 40, the cathode of a diode 42, the anode of a diode 44 and the inverted input terminal of a comparator 46, which serves as a comparing means. The other end of the resistor 40 and the anode of the diode 42 are connected to the ground terminal 36 while the cathode of the diode 44 is connected to a power supply terminal 34. The power supply terminal 34 is connected to an unillustrated constant-voltage power supply so that a constant voltage (such as 5 V) is supplied from the power supply.

Further, one end of a resistor 48 is connected to the power supply terminal 34. Connected to the other end of the resistor 48 are one end of a resistor 50, whose other end is connected to the ground terminal 36, and the non-inverted input terminal of the comparator 46. Accordingly, a constant voltage obtained by the voltage division by the resistors 48 and 50 is supplied to the input terminal of the comparator 46 as a reference voltage. The power supply terminal of the comparator 46 is connected to the power supply terminal 34 and the ground terminal of the comparator 46 is connected to the ground terminal 36 so that power is supplied to the comparator 46 for operation.

Diodes 42 and 44 are arranged for protecting the comparator 46 and are not limited to the arrangement shown in FIG. 1. For example, the diode 42 may be disposed between the terminal 30A and the resistor 38 such that its anode is connected to the terminal 30A and its cathode is connected to the resistor 38. Further, the diodes 42 and 44 may be disposed between the inverted input terminal and the non-inverted input terminal of the comparator 46 such that the orientations of the diodes 42, 44 are opposite to each other.

Connected to the output terminal of the comparator 46 are one end of a resistor 52, one end of a resistor 54 and the anode of a diode 56. The other end of the resistor 52 is connected to the power supply terminal 34. Further, the other end of the resistor 54 is connected to the cathode of the diode 58. The anode of the diode 58 and the cathode of the diode 56 are connected to a signal input terminal of a voltage controlled oscillator circuit 60. One end of a capacitor 62 is connected to a line connecting the anode of the diode 58 and the cathode of the diode 56 with the signal input terminal of the voltage controlled oscillator circuit 60, while the other end of the capacitor 62 is grounded.

The power supply terminal of the voltage controlled oscillator circuit 60 is connected to the power supply terminal 34 and the ground terminal thereof is connected to the ground terminal 36 so that power is supplied to the voltage controlled oscillator circuit 60 for operation. The voltage controlled oscillator circuit 60 outputs a signal whose frequency changes in accordance with the voltage level at the signal input terminal, namely, the voltage between both ends of the capacitor 62, such that the frequencies of the drive signals are lowered as the voltage level becomes higher. The output terminal of the voltage controlled oscillator circuit 60 is branched into two lines, one of which is connected to the input terminal of an amplifier circuit 64 and the other of which is connected to the input terminal of an amplifier circuit 68 via a phase shifter 66.

The phase shifter 66 shifts the phase of the input signal by 90 degrees and outputs the shifted signal. Accordingly, the amplifier circuits 64 and 68 are supplied with signals whose frequencies and amplitudes are the same but whose phases differ by 90 degrees from each other. The output terminal of the amplifier circuit 64 is connected to one end of the piezoelectric body 14A through a terminal 30C while the output terminal of the amplifier circuit 68 is connected to one end of the piezoelectric body 14B through a terminal 30D. These piezoelectric bodies 14A and 14B form the piezoelectric body 14 of the ultrasonic motor 10. The other end of each of the piezoelectric bodies 14A and 14B is grounded through a terminal 30E.

Figure 3:
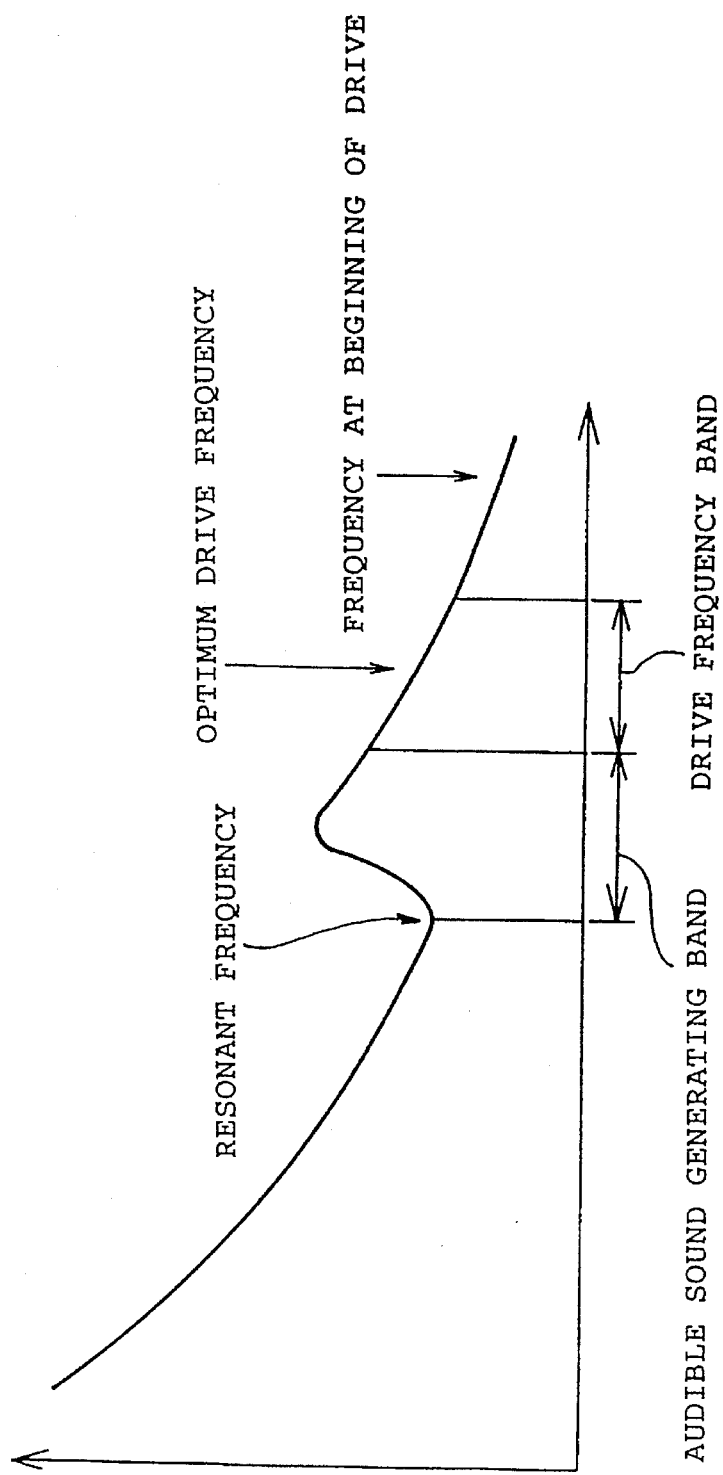
FIG. 3 is a diagram showing the impedance of the ultrasonic motor as a function of the frequencies of drive signals, and showing a resonant frequency, an audible sound generating band and a drive frequency band.

Operation of the present embodiment will now be explained. When the ultrasonic motor 10 is driven, the voltage controlled oscillator circuit 60 of the drive circuit 30 outputs a signal whose frequency (indicated as "FREQUENCY AT BEGINNING OF DRIVE" in FIG. 3) is sufficiently higher than the drive frequency band (see FIG. 3). The signal output from the voltage controlled oscillator circuit 60 is divided into two, and the phase of one divided signal is shifted by 90 degrees by the phase shifter 66. These signals are amplified by the amplifier circuits 64 and 68, respectively, so that a sine-wave drive signal and a cosine-wave drive signal are generated and supplied to the piezoelectric bodies 14A and 14B of the ultrasonic motor 10.

Figure 5A:
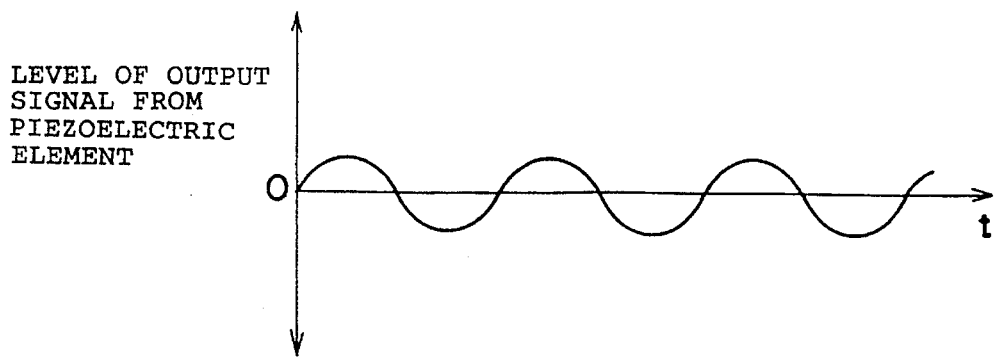
FIG. 5A is a diagram showing an output signal from a piezoelectric element in a case in which the frequencies of drive signals are sufficiently higher than the drive frequency band.

The drive signals are converted to mechanical vibration by the piezoelectric bodies 14A and 14B so that a traveling wave is excited in the elastic body 12 of the ultrasonic motor 10, whereby the drive shaft 16 and the rotor 18 are rotated. Further, the vibrations of the elastic body 12 are converted into an electric signal by the piezoelectric element 32, and the electric signal is supplied to the drive circuit 30. At this time, since the frequencies of the drive signals are sufficiently high, the amplitude of the vibrations of the elastic body 12 is small and the amplitude of the detection signal from the piezoelectric element 32 is also small, as shown in FIG. 5A.

Figure 5B:
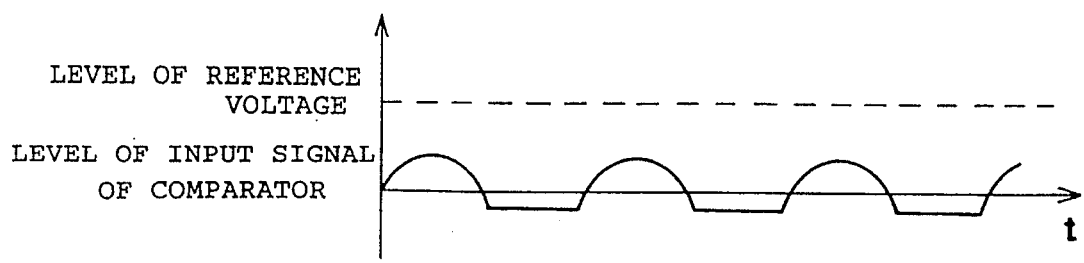
FIG. 5B is a diagram showing an input signal input to a comparator in a case in which the frequencies of drive signals are sufficiently higher than the drive frequency band.

The detection signal is subjected to half-wave rectification by the diode 42 to obtain a rectified signal as shown in FIG. 5B, and the signal is input to the inverted input terminal of the comparator 46. The negative components of the signal shown in FIG. 5B are produced due to the forward direction voltage drop of the diode 42. The level of the signal input to the inverted input terminal of the comparator 46 is compared with the voltage level of the reference voltage (the level illustrated by the broken line in FIG. 5B), which is obtained by the voltage division by the resistors 48 and 50 and which is supplied to the non-inverted input terminal of the comparator 46.

Figure 5C:
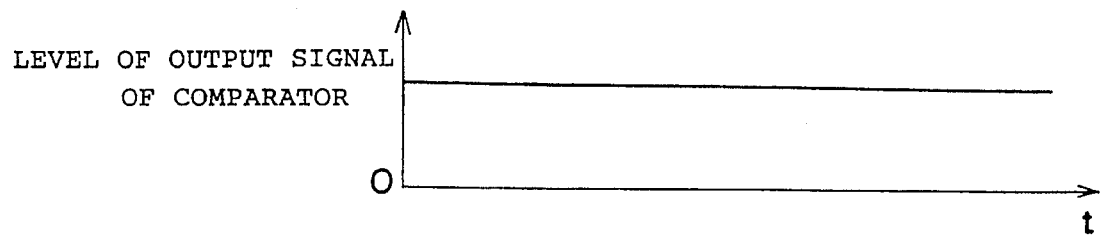
FIG. 5C is a diagram showing an output signal from the comparator in a case in which the frequencies of drive signals are sufficiently higher than the drive frequency band.
Figure 5D:
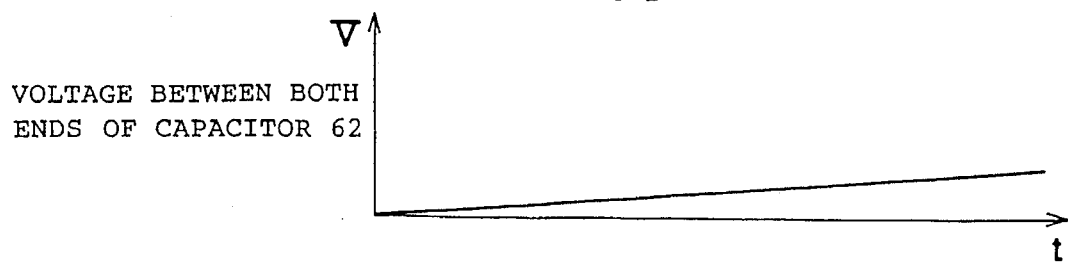
FIG. 5D is a diagram showing a change in the level of the voltage V between both terminals of a capacitor in a case in which the frequencies of drive signals are sufficiently higher than the drive frequency band.

As shown in FIG. 5B, since the amplitude of the detection signal is small, the level of the signal input to the inverted input terminal does not exceed the voltage level of the reference voltage, so the comparator 46 always outputs a signal of high level (see FIG. 5C). While the signal output from the comparator 46 is at a high level, current flows to the capacitor 62 via the diode 56 so that the capacitor 62 is gradually charged. Accordingly, the voltage V between both ends of the capacitor 62 gradually increases as shown in FIG. 5D so that the frequencies of the drive signals output from the voltage controlled oscillator circuit 60 are gradually lowered toward the drive frequency band.

The amount of charge to the capacitor 62 per unit time depends on the electrical resistance of the resistor 52. In a case in which the electrical resistance of the resistor 52 is low, the speed of charging becomes faster (the inclination of the line shown in FIG. 5D becomes larger). On the other hand, in a case in which the electrical resistance of the resistor 52 is large, the speed of charging becomes slower (the inclination of the line shown in FIG. 5D becomes smaller).

Figure 6A:
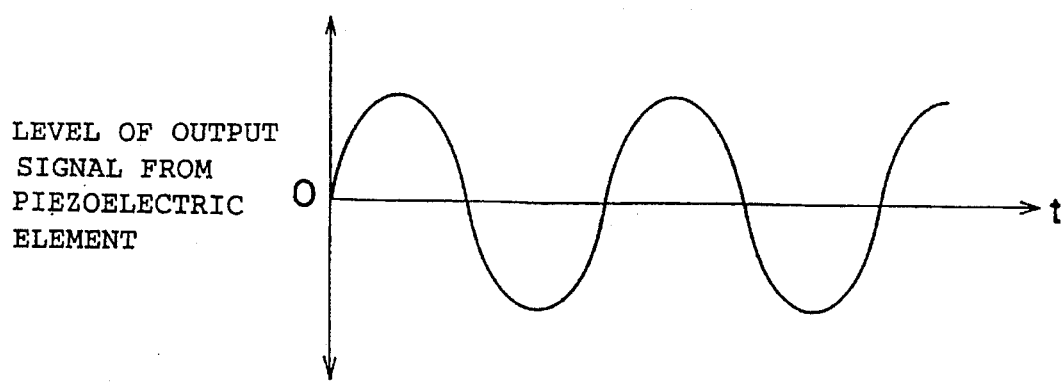
FIG. 6A is a diagram showing an output signal from the piezoelectric element in a case in which the frequencies of the drive signals are optimum drive frequencies.
Figure 6B:
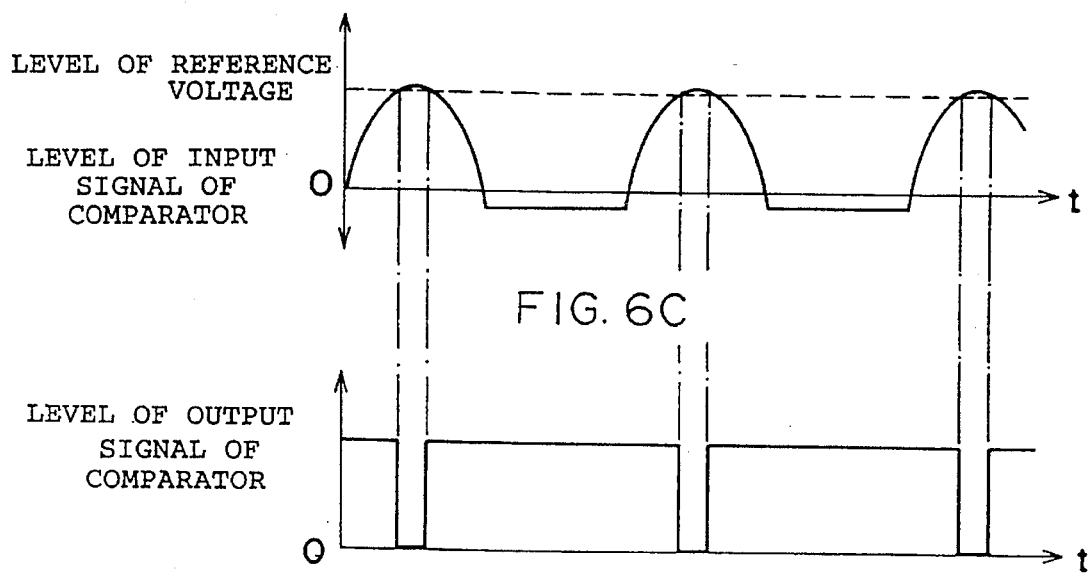
FIG. 6B is a diagram showing an input signal input to the comparator in a case in which the frequencies of the drive signals are optimum drive frequencies.
Figure 6C:
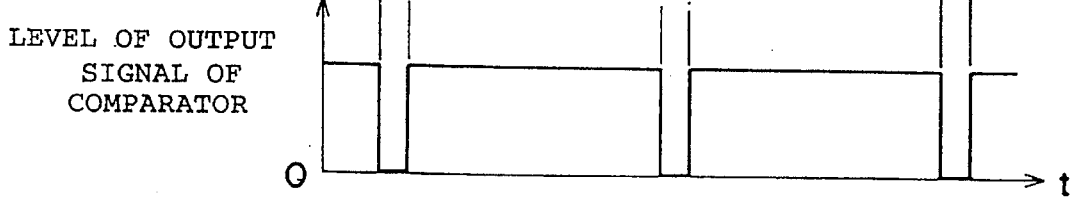
FIG. 6C is a diagram showing an output signal from the comparator in a case in which the frequencies of the drive signals are optimum drive frequencies.

When the frequencies of the drive signals are gradually lowered as explained above, the amplitude of vibration of the elastic body 12 becomes larger so that the amplitude of the detection signal output from the piezoelectric element 32 also becomes larger, as shown in FIG. 6A. Accordingly, a period is periodically produced in which the level of the signal, which has been rectified by the diode 42 and input to the inverted input terminal of the comparator 46, exceeds the level of the reference voltage, as shown in FIG. 6B. Accordingly, the signal output from the comparator 46 is at a low level during periods in which the level of the rectified signal exceeds the level of the reference voltage, as shown in FIG. 6C.

Figure 6D:
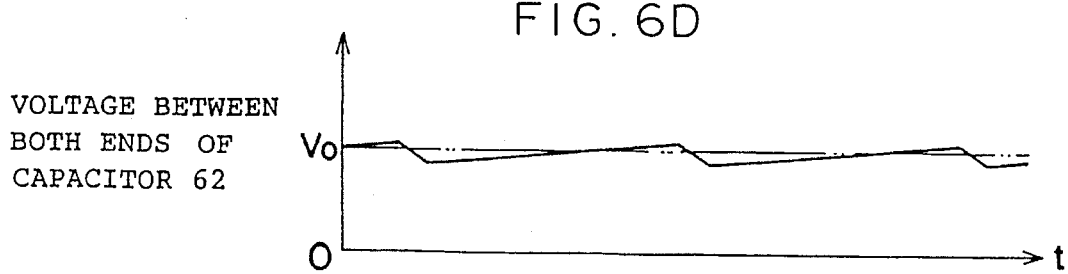
FIG. 6D is a diagram showing a change in the level of the voltage V between both terminals of a capacitor in a case in which the frequencies of the drive signals are optimum drive frequencies.

In each period in which the signal output from the comparator 46 is at a low level, the electric charge accumulated in the capacitor 62 is discharged via the diode 58 and the resistor 54 so that the voltage between both ends of the capacitor 62 is lowered (see FIG. 6D). Due to the discharge, the voltage V between both ends of the capacitor 62 is maintained at a constant level Vo, as illustrated by the imaginary line in FIG. 6D. The amount of discharge from the capacitor 62 per unit time depends on the electrical resistance of the resistor 54. In a case in which the electrical resistance of the resistor 54 is low, the speed of the discharge becomes faster (the inclination of the line shown in FIG. 6D during periods in which voltage decreases becomes larger). On the other hand, in a case in which the electrical resistance of the resistor 54 is large, the speed of the discharge becomes slower (the inclination of the line shown in FIG. 6D during periods in which voltage decreases becomes smaller).

In the present embodiment, the level of the voltage supplied to the non-inverted input terminal of the comparator 46 is determined in advance such that, when the voltage V is at a constant level, the frequency of the signal output from the voltage controlled oscillator circuit 60 coincides with the optimum drive frequency in the drive frequency band (see FIG. 3) at which both the rotational speed and the efficiency of the ultrasonic motor 10 become maxima. Accordingly, the frequencies of the drive signals are gradually lowered from the frequency band sufficiently higher than the drive frequency band, as explained above, and the frequencies are maintained after the frequencies have reached the optimum drive frequency.

Figure 4:
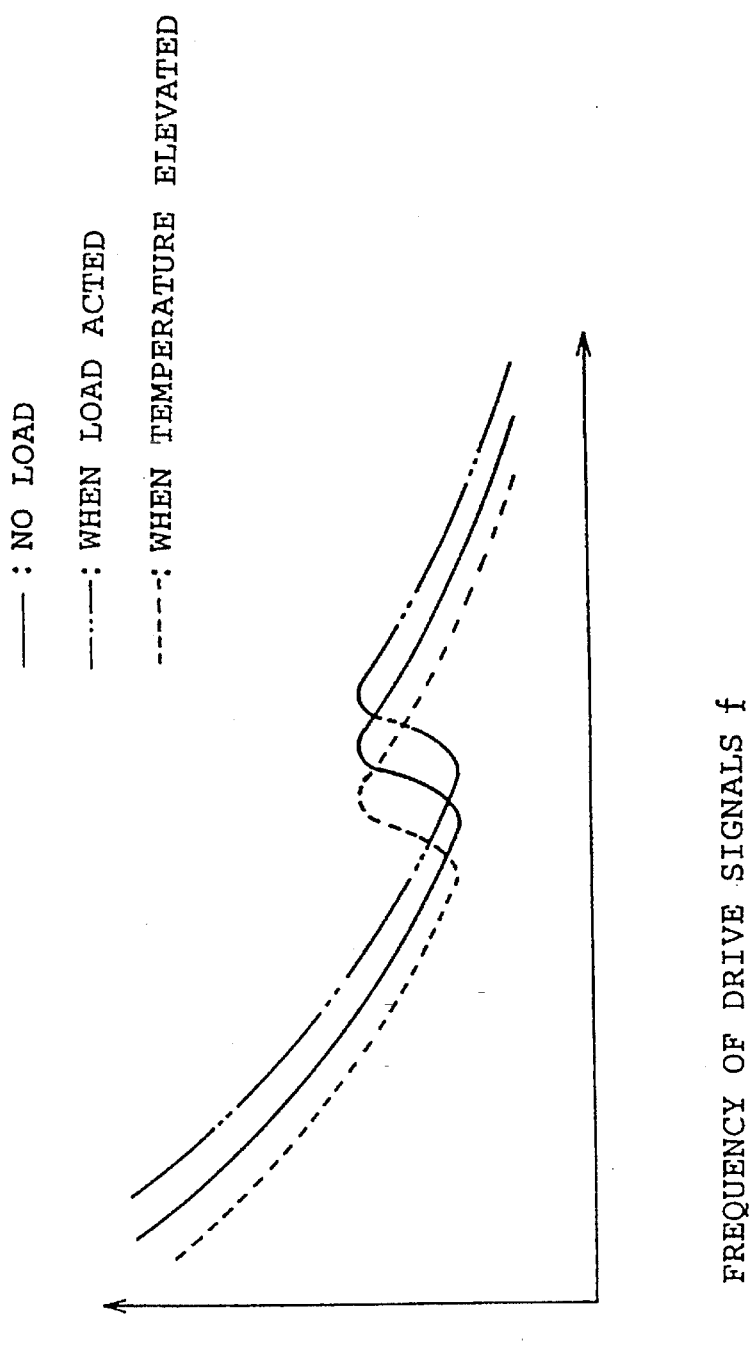
FIG. 4 is a diagram showing the impedance characteristics of the ultrasonic motor as a function of frequencies in a case in which the temperature increases and in a case in which a load acts on the motor.

On the other hand, in a case in which the temperature increases or in a case in which a load acts on the ultrasonic motor 10, the impedance characteristic of the ultrasonic motor 10 changes as shown in FIG. 4 so that the frequencies corresponding to the optimum drive frequency, the drive frequency band and the audible sound generating band (see FIG. 3) also change. When the frequencies of the drive signals become higher than the optimum drive frequency, the amplitude of the detection signal becomes smaller, as was explained with reference to FIG. 5, so that the frequencies of the drive signals are controlled by the drive circuit 30 so as to be lowered.

In a case in which the frequencies of the drive signals become lower than the optimum drive frequency and enter the audible sound generating band, a large irregularity is produced in the amplitude and in the period of the detection signal, as shown in FIG. 7A. As a result, with regard to the signal input to the inverted input terminal of the comparator 46, periods in which the amplitude far exceeds the level of the reference voltage and periods in which the amplitude does not exceed the level are mixed, as shown in FIG. 7B. As a whole, the length of each period in which the signal exceeds the level of the reference voltage becomes longer compared to the case in which the ultrasonic motor 10 is driven at the optimum drive frequency (see FIG. 6B) because of the above-mentioned large amplitude.

Accordingly, as illustrated in FIG. 7C, the length of each period in which the signal output from the comparator 46 is at a low level becomes longer so that the amount of discharge from the capacitor 62 becomes larger than the amount of charge thereto. As a result, the voltage V between both ends of the capacitor 62 is lowered as a whole, as illustrated by the imaginary line in FIG. 7D so that the frequencies of the drive signals are raised and return to the drive frequency band. As described above, the frequencies are controlled by the drive circuit 30 such that the frequencies return the drive frequency range when the frequencies of the drive signals deviate from the drive frequency band due to the effects of temperature and load. Accordingly, the ultrasonic motor 10 is controlled such that the drive frequencies pursue the optimum drive frequency without causing drawbacks such as continuous generation of audible sound from the ultrasonic motor 10.

Figure 8A:
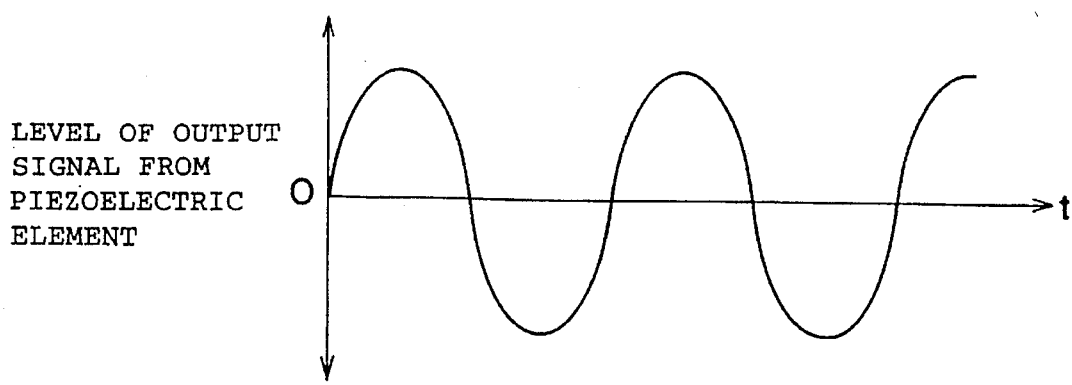
FIG. 8A is a diagram showing an output signal from the piezoelectric element in a case in which the frequencies of the drive signals are in the audible sound generating band and irregularity of the amplitude and period of vibration of the elastic body does not occur.
Figure 8B:
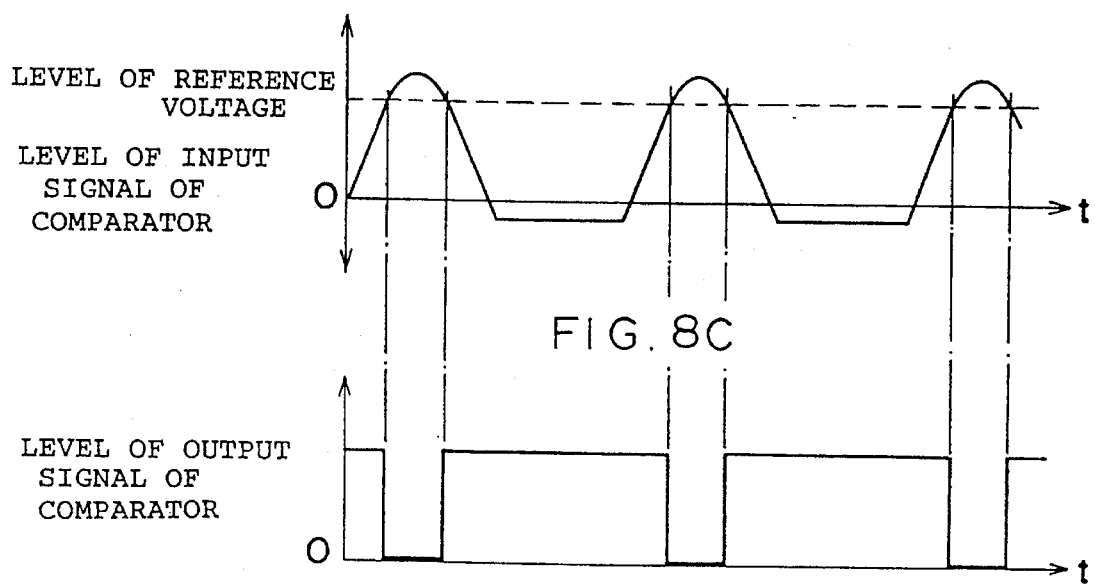
FIG. 8B is a diagram showing an input signal input to the comparator in a case in which the frequencies of the drive signals are in the audible sound generating band and irregularity of the amplitude and period of vibration of the elastic body does not occur.

Next, an explanation will be given of a case in which in the ultrasonic motor 10, irregularity of the waveform of detection signal does not occur even when the frequencies of the drive signals enter the audible sound generating band. In this case, the amplitude of the signal output from the piezoelectric element 32 becomes larger, as shown in FIG. 8A, when the frequencies of the drive signals becomes lower than the drive frequency band and enter the audible sound generation band. However, the period and amplitude are constant and no irregularity occurs in the waveform. In such a case, similar to the previously-described case, the length of each period in which the level of the signal input to the inverted input terminal of the comparator 46 exceeds the level of the reference voltage becomes longer compared to the case in which the ultrasonic motor 10 is driven at the optimum drive frequency (see FIG. 6B) although periods in which the signal exceeds the level of the reference voltage cyclically emerge, as shown in FIG. 8B.

Figure 8C:
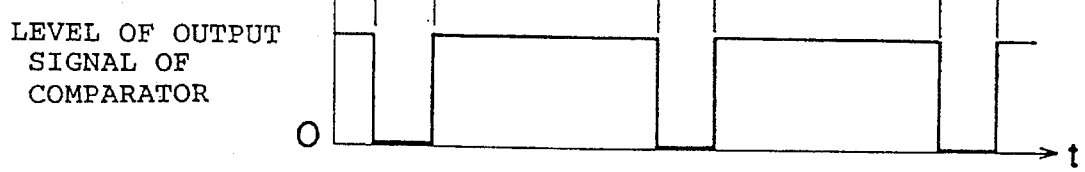
FIG. 8C is a diagram showing an output signal from the comparator in a case in which the frequencies of the drive signals are in the audible sound generating band and irregularity of the amplitude and period of vibration of the elastic body does not occur.
Figure 8D:
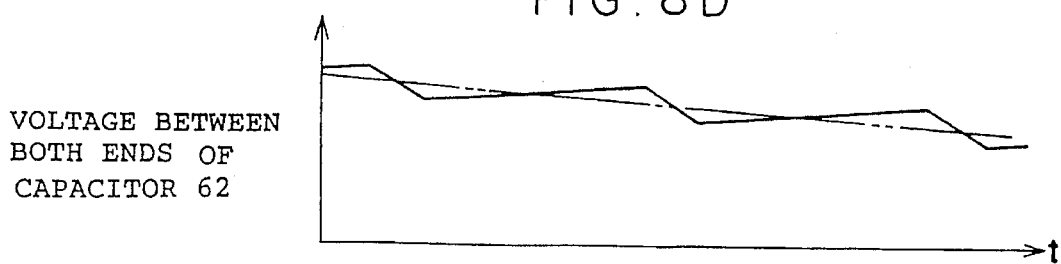
FIG. 8D is a diagram showing a change in the level of the voltage V between both terminals of the capacitor in a case in which the frequencies of the drive signals are in the audible sound generating band and irregularity of the amplitude and period of vibration of the elastic body does not occur.

Accordingly, the length of each period in which the signal output from the comparator 46 is at a low level becomes longer, as shown in FIG. 8C, so that the voltage V between both ends of the capacitor 62 is lowered as a whole, as illustrated by the imaginary line in FIG. 8D. As a result, the frequencies of the drive signals are raised so as to return to the drive frequency band. As described above, the drive circuit 30 according to the present embodiment is capable of driving ultrasonic motors, in which irregularity of the wave form of the detection signal does not occur in the audible sound generating band, without causing drawbacks such as generation of audible sound.

The above-mentioned operation of the drive circuit for driving the ultrasonic motor 10 is illustrated in brief by the flowchart in FIG. 9. Namely, in step 100, the driving of the ultrasonic motor 10 is started by using drive signals of a frequencies sufficiently higher than the drive frequency band. In step 102, the level of the detection signal (or a signal after rectification) is compared with the level of the reference voltage by the comparator 46. When the level of the signal obtained by rectifying the detection signal exceeds the level of the reference voltage, the frequencies of the drive signals are raised in step 104 during the period in which the level of the signal exceeds the level of the reference voltage. When the level of the signal obtained by rectifying the detection signal does not exceed the level of the reference voltage, the frequencies of the drive signals are lowered in step 106 during the period in which the level of the signal is below or equal to the level of the reference voltage.

By repeating the processes in steps 102, 104 and 106, the ultrasonic motor is driven without causing drawbacks such as continuous generation of audible sound whether the ultrasonic motor is an ultrasonic motor in which irregularity of the waveform of the detection signal occurs in the audible sound generating band or is an ultrasonic motor in which irregularity of the waveform of the detection signal does not occur in the audible sound generating band. When the frequencies of the drive signals coincide with the optimum drive frequency, the ratio of the length of each period in which the detection signal exceeds the level of the reference voltage to the length of each period in which the detection signal does not exceed the level of the reference voltage becomes constant. Accordingly, the amount of change in the frequency in step 104 becomes equal to the amount of change in the frequency in step 106 so that the frequencies of the drive signals are maintained so as to coincide with the optimum drive frequency.

In the above-mentioned embodiment, the frequencies of the drive signals are controlled by charging and discharging the capacitor 62 in accordance with the level of the signal output from the comparator 46. The present invention, however, is not limited to this arrangement. For example, the level of the detection signal may be monitored by a microprocessor or the like so as to calculate the amount of change in the frequencies of the drive signals based on the length of each period in which the detection signal exceeds the level of the reference voltage and the length of each period in which the detection signal does not exceed the level of the reference voltage within a give period of time.

What is claimed is:

1. A drive circuit for an ultrasonic motor comprising:
   a drive signal outputting device for outputting ultrasonic motor drive signals of predetermined frequencies;
   a detector for detecting vibration of a stator of said ultrasonic motor and for outputting a continuous waveform whose amplitude value corresponds to said vibration;
   a comparator for comparing said continuous waveform and a predetermined level set in advance, and for determining portions of said continuous waveform which exceed said predetermined level and portions of said continuous waveform which do not exceed said predetermined level; and
   a frequency controller for bringing frequencies of said drive signals into a drive frequency band by raising said frequencies of said drive signals only in a period in which said continuous waveform exceeds said predetermined level at portions of said continuous waveform which exceed said predetermined level, and by lowering said frequencies of said drive signals only in a period in which said continuous waveform does not exceed said predetermined level at portions of said contiuous waveform wich do not exceed said predetermined level.

2. The drive circuit for an ultrasonic motor according to claim 1, wherein said frequency controller includes a capacitor and a voltage controlled oscillator circuit, and controls the frequency of said drive signals by changing a voltage used for controlling said voltage controlled oscillator circuit by charging and discharging said capacitor based on results of said comparator.

3. The drive circuit for an ultrasonic motor according to claim 1, wherein said frequency controller controls said frequencies by using a frequency control medium, and said predetermined level is a value such that an amount of change in said frequency control medium for raising said frequencies in a period in which said continuous waveform exceeds said predetermined level and an amount of change in said frequency control medium for lowering said frequencies in a period in which said continuous waveform does not exceed said predetermined level become equal when said ultrasonic motor is driven by said drive signals whose frequencies are within said drive frequency band.

4. The drive circuit for an ultrasonic motor according to claim 1, wherein said frequencies of said drive signals are controlled so as to coincide with an optimum drive frequency within said drive frequency band.

5. The drive circuit for an ultrasonic motor according to claim 1, wherein said frequencies of said drive signals are controlled such that said frequencies become higher than said drive frequency band when driving of said ultrasonic motor is started.

6. The drive circuit for an ultrasonic motor according to claim 5, wherein a speed at which said frequencies of said drive signals are brought into said drive frequency band is adjustable.

7. The drive circuit for an ultrasonic motor according to claim 1, wherein a speed at which said frequencies of said drive signals are raised by said frequency controller is adjustable.

8. The drive circuit for an ultrasonic motor according to claim 1, wherein said frequency controller calculates an amount of change in said frequencies of said drive signals based on a length of a period in which said continuous waveform exceeds said predetermined level and a length of a period in which said continuous waveform does not exceed said predetermined level within a given period of time, and controls said frequencies based on a calculated amount.

9. A method of driving and controlling an ultrasonic motor comprising the steps of:
   outputting ultrasonic motor drive signals of predetermined frequencies;
   detecting vibration of a stator of said ultrasonic motor and outputting a continuous waveform whose amplitude value corresponds to said vibration;
   comparing said continuous waveform and a predetermined level set in advance, and determining portions of said continuous waveform which exceed said predetermined level and portions of said continous waveform which do not exceed said predetermined level; and
   bringing frequencies of said drive signals into a drive frequency band by raising said frequencies of said drive signals only in a period in which said continous waveform exceeds said predetermined level at the portions of said continuous waveform which exceed said predetermined level, and by lowering said frequencies of said drive signals only in a period in which said continuous waveform does not exceed said predetermined level at portions of said continuous waveform which do not exceed said predetermined level.

10. The method of driving and controlling an ultrasonic motor according to claim 9, wherein said frequencies of said drive signals are controlled by using a frequency control medium, and said predetermined level is a value such that an amount of change in said frequency control medium for raising said frequencies in a period in which said continuous waveform exceeds said predetermined level and an amount of change in said frequency control medium for lowering said frequencies in a period in which said continuous waveform does not exceed said predetermined level become equal when said ultrasonic motor is driven by said drive signals whose frequencies are within said drive frequency band.

11. The method of driving and controlling an ultrasonic motor according to claim 9, wherein said frequencies of said drive signals are controlled so as to coincide with an optimum drive frequency within said drive frequency band.

12. The method of driving and controlling an ultrasonic motor according to claim 9, wherein said frequencies of said drive signals are controlled such that said frequencies become higher than said drive frequency band when driving of said ultrasonic motor is started.

13. The method of driving and controlling an ultrasonic motor according to claim 12, wherein a speed at which said frequencies of said drive signals are brought into said drive frequency band is adjustable.

14. The method of driving and controlling an ultrasonic motor according to claim 9, wherein a speed at which said frequencies of said drive signals are raised is adjustable.

15. The method of driving and controlling an ultrasonic motor according to claim 9, wherein an amount of change in said frequencies of said drive signals is calculated based on a length of a period in which said continuous waveform exceeds said predetermined level and a length of a period in which said continuous waveform does not exceed said predetermined level within a given period of time, and said frequencies are controlled based on a calculated amount.

* * * * *